Feb. 6, 1973  W. C. FILBERT  3,715,096
ARTICLE SUPPORT
Filed June 18, 1971
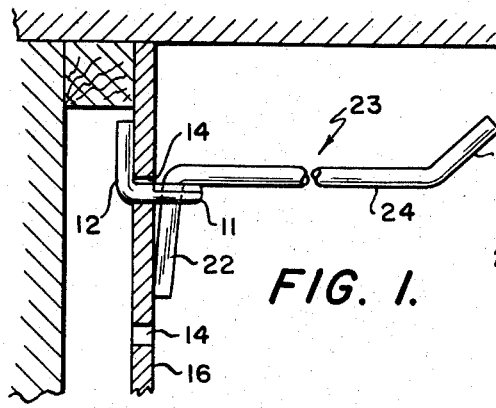
FIG. 1.
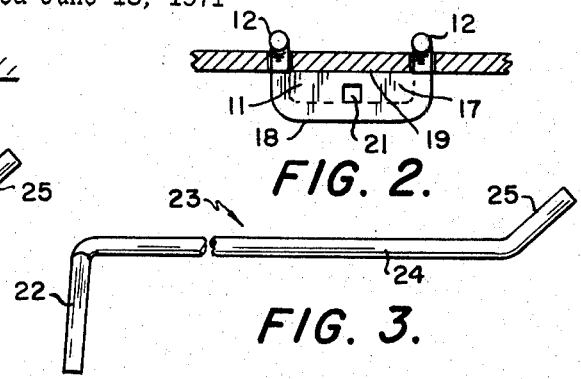
FIG. 2.
FIG. 3.
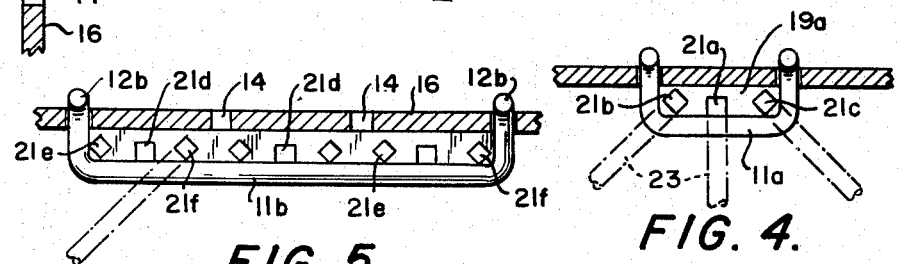
FIG. 5.
FIG. 4.
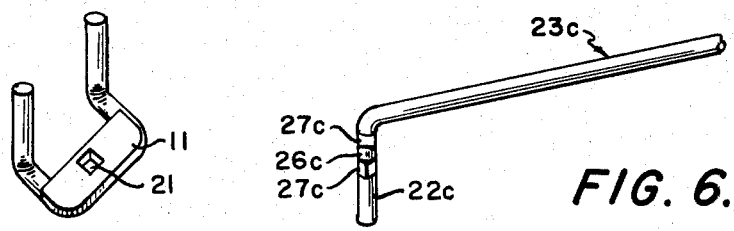
FIG. 6.
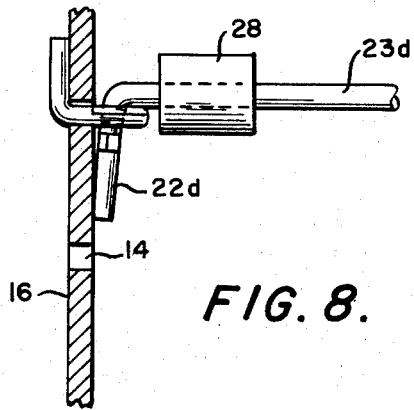
FIG. 7.
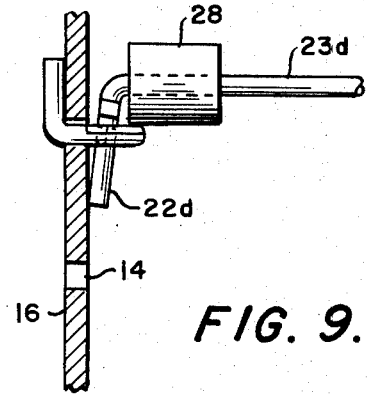
FIG. 8.
FIG. 9.
INVENTOR.
WILBUR C. FILBERT
BY
Harold W. Adams
ATTORNEY

United States Patent Office 3,715,096
Patented Feb. 6, 1973

3,715,096
ARTICLE SUPPORT
Wilbur C. Filbert, 113 Tapawingo Road SW.,
Vienna, Va. 22180
Filed June 18, 1971, Ser. No. 154,489
Int. Cl. A47f 5/00
U.S. Cl. 248—223                                    17 Claims

ABSTRACT OF THE DISCLOSURE

An article support for use with a pegboard having horizontal rows of uniformly spaced holes therein comprising a base with integrally formed legs thereon spaced a distance equal to the distance between centers of the holes in said horizontal rows of holes or any multiple thereof and adapted to be received within the holes within said pegboard, the base having at least one rectangular aperture therein adapted to detachably receive and rotatably suport a rectangular end portion extending angularly from a body portion of a hook member so the legs, base and end portion cooperate to support said hook member on said pegboard. A plurality of angularly spaced rectangular apertures may be provided at each hook position whereby the hook member may be supported by said base at selected angle relative to said pegboad. The end portion of the hook member may be provided with corresponding and angularly off-set rectangular portions separated by a cylindrical portion whereby the hook member may be angularly adjusted relative to the pegboard within a single rectangular aperture in the base.

---

This invention relates to a detachable article support for use with a panel or pegboard having horizontal rows of uniformly spaced holes. More particularly this invention relates to an article support including a base adapted to be secured to a pegboard and means formed on said base and one or more hook members whereby a hook member may be detachably and non-rotatably secured in two or more angular positions relative to said base, at one or more hook positions.

Two-piece article supports are known. For instance U.S. Pats. 3,339,871, 3,289,994, and 3,198,469 to R. L. Larson, H. Burmeister and R. A. E. Callanan, respectively, show such devices generally as including a bracket, anchor or base adapted to detachably receive a hook member. However, none of the known two piece supports, to the inventor's knowledge, permit the hook member to be secured by the base in any position other than transverse to the pegboard—the article supporting position.

Since two-piece supports are commonly used for displaying merchandise along crowded store aisles, the hook member when not in use constitute a serious safety hazard. To avoid this dangerous condition using conventional supports it is necessary to remove and store the hooks when not in use or when changing and/or rearranging the display. Also, to the inventor's knowledge, none of the so-called two-piece supports include a base for detachably supporting more than one hook member.

Therefore, an object of this invention is to provide an article support for use with a pegboard including a base and a hook member and including cooperative means formed on said base and hook member whereby said hook member may be detachably secured to said base at selected angles relative to said base at a single hook position.

A further object of this invention is to provide an article suport for use with a pegboard including a base for bridging two or more peg holes in said pegboard and providing two or more spaced hook positions, said base including cooperative means formed at each of said hook positions and a hook member whereby said hook member may be detachably secured to said base at selected angles at each of said hook positions.

Another object of this invention is to provide an article support for use with a pegboard including a base detachably secured to said pegboard and a separate hook member, the base having a rectangular aperture therein and the hook member having an end portion thereon, said end portion including at least one rectangular portion and one cylindrical portion whereby said hook member may be angularly adjusted relative to said pegboard without removal of said end portion from said aperture in said base.

Yet another object of this invention is to provide an article support for use with a pegboard including a base having an aperture therein, a hook member adapted to be received within said base and adjustable means on said hook member for securing said hook member within said aperture at selected angles relative to said pegboard.

DESCRIPTION OF FIGURES OF THE DRAWING

These and other objects of the invention will become apparent from the following description of a preferred embodiment of the invention when read in view of the appended drawing wherein:

FIG. 1 is a side elevational view illustrating a preferred embodiment of the invention installed in a pegboard or panel;

FIG. 2 is a plan view of the base of the article support shown in FIG. 1 with the hook member removed;

FIG. 3 is an enlarged side elevational view of the hook member shown in FIG. 1 removed from the base;

FIG. 4 is a plan view of the base of an alternative embodiment of the article support, the base having a plurality of angularly spaced rectangular apertures for receiving a hook member at a single hook position;

FIG. 5 is a further alternative embodiment of the invention shown in FIGS. 1, 2, and 3, wherein the base provides more than one hook position.

FIGS. 6 and 7 illustrate yet another alternative embodiment of the invention shown in FIGS. 1 and 2 wherein the end of the hook member received in the base includes at least one rectangular portion and one cylindrical portion; and FIGS. 8 and 9 illustrate another embodiment of the invention shown in FIGS. 6 and 7 wherein the hook member carries a sleeve adapted to secure the end of the hook member within the aperture in the base at selected angles relative to the pegboard.

DETAILED DESCRIPTION

Referring now to FIGS. 1–3 of the drawings the invention comprises a base 11 having integrally formed legs 12 thereon extending transversely from the base. The legs 12 are spaced horizontally a distance equal to the distance between centers of adjacent holes 14 in a conventional pegboard 16 to which the base is detachably affixed.

The base 11 provides a planar surface 17 defined by outer and inner edges 18 and 19 respectively. As shown in FIG. 2 the distance between the inner edge 19 and the inner surface of the legs 12 is just slightly larger than the thickness of the pegboard 16. The diameter or thickness of legs 12 is slightly smaller than the holes 14.

An angular aperture 21 (here shown as a rectangle) extends through the base, the side wall of the aperture adjacent the inner edge 19 being parallel to the inner edge, and receives a slightly smaller end portion 22 of hook member 23. The end 22 of the same angular configuration as aperture 21 is of sufficient length and disposed at such an angle relative to body portion 24 of the hook member 23, so that the end portion 22 engages the pegboard to support the body portion 24 of the hook substantially horizontally when inserted through aperture 21.

In this fashion any article affixed to the hook 23 as shown in FIG. 1 is supported by the end portion 22, the inner edge 19 of base 11 and legs 12. The hook normally extends transversely of the pegboard in the article supporting position, but may be secured in the aperture 21 so that it extends parallel to the pegboard by withdrawing the hook member, and rotating same 90° and then reinserting the end 22 into the rectangular aperture 21. End 25 of hook 23 may also be upturned or otherwise formed to assist in securing an article to be supported.

An alternative embodiment of the invention as shown in FIG. 4 includes three rectangular apertures 21a, b, and c, 21a being positioned as aperture 21 in FIG. 2, and apertures 21b and c being turned at equal or any desired angle from the side wall of aperture 21. By inserting the end 22 in any one of the apertures 21a, b, or c, the hook member may be angularly adjusted relative to the pegboard. The hook 23 may be secured parallel to the pegboard by the base when not in use. The aperture 21a, b, and c, are all positioned so the end portion 22 of hook 23 engages the pegboard when inserted therethrough to provide a three point support as in the preferred embodiment.

FIG. 5 illustrates another embodiment of the invention in which the length of base 11b as well as the distance between legs 12b is any selected multiple of the distance between centers of the holes 14 of pegboard 16. In this arrangement the base 11b includes a number of rectangular apertures 21d arranged as apertures 21 in FIG. 2 to provide a plurality of spaced hook positions along the length of base 11b. Each hook position 21d may also be provided with angularly spaced rectangular apertures 21e and f arranged as in the alternative embodiment illustrated in FIG. 4 and heretofore described so a hook member 23 may be selectively secured at predetermined angles relative to said pegboard 16 at each hook position. The apertures 21b may be randomly or uniformly spaced along the length of base 11b.

FIGS. 6 and 7 illustrate another alternative embodiment of the invention in which the hook member 23c is modified for use with the base of all the embodiments heretofore described. The end portion 22c is provided with at least one cylindrical portion 26 and one rectangular portion 27 corresponding in configuration to the apertures 21 and 21a-f. The cylindrical portion 26 is slightly longer than the thickness of bases 11, 11a or 11b and slightly smaller in diameter than the width of the rectangular apertures 21, and 21a-f. When using a single lower cylindrical portion 26 and a single upper rectangular portion 27 the hook 23c may be moved from the in use position (extending transversely from the pegboard) to the non-use storage position by withdrawing the rectangular end portion from the aperture until the cylindrical portion is within the bases 11, and 11a-c, and then turning the hook 90° until it extends parallel to the pegboard at which time the rectangular portion 27 of the end 22c is received in one of the rectangular apertures.

Another embodiment of the invention is shown in FIGS. 8 and 9 wherein hook member 23d is provided with a slidable latching sleeve 28 to secure the lower of the heretofore described rectangular portions 27 of end 22d within a rectangular aperture 21, or 21a-f, as shown in FIG. 9. The thickness of sleeve 28 is slightly greater than the thickness of the base 11 or 11a-c. This permits angular adjustment of hook member 23d relative to the pegboard 16 by turning the hook 23d with cylindrical portion 26c within the base 11 or base 11a-c.

The preferred or alternative embodiments of the invention may be fabricated of any material having the desired physical properties. The base may be integrally formed as by stamping or casting or made of two pieces. The legs may be formed of a suitable bar stock, bent in U shaped configuration with the ends upturned at approximately 90°. The base, with one or more rectangular apertures therein in accordance with the invention may be spot welded to the leg member. The hook may be formed of a suitable bar stock having the desired strength characteristics.

As shown and described herein this invention permits full utilization of the entire surface area of the pegboard—even at the ceiling or upper limiting surface of the pegboard installation. The base, legs and hook cooperate to provide a three point support while the base and hook member permit angular adjustment of the hook member relative to the vertical surface of the pegboard. This is not only a safety feature but facilitates display arrangements without the removal and storage of the hook separate from the base. The multi, variably spaced hook position base permits random display of different sized merchandise along a horizontal row unrestricted by the uniform spacing of the holes in conventional pegboard.

Although preferred embodiments of the invention have been described in detail numerous modifications in shapes, sizes, and constructions of the support may be made within the principles of the invention which is to be limited only by the scope of the appended claims.

I claim:

1. An article support for use with a panel providing a vertical planar surface and having uniformly spaced apertures in spaced horizontal rows therein comprising:
    (a) A detachable base providing a planar surafce including an inner edge and having an aperture therein;
    (b) A pair of legs extending from said base upwardly and transversely from said planar surface, said legs being spaced a distance corresponding to the distance between centers of said adjacent horizontally spaced apertures in said panel, the inner surface of said legs being spaced a distance equal to the thickness of said panel from said inner edge of said planar surface of said base; and
    (c) A hook member having a body portion and at least one angularly extending end integrally formed on said hook member, said end portion being formed and adapted to be non-rotatably received within said aperature in said planar surface, said end extending at an angle relative to said body portion of said hook member to engage said panel upon insertion through said aperture in said planar surface, said legs, inner edge of said base, and said angular end of said hook member cooperating to support an article affixed to said hook member.

2. An article support as defined in claim 1 wherein both said aperture in said planar surface and said angular end portion of said hook member are of the same angular configuration.

3. An article support as defined in claim 2 wherein said planar surface of said base includes a plurality of rectangular apertures angularly spaced relative to the other whereby said hook member may be selectively positioned at a predetermined angular position relative to said vertical planar surface of said panel.

4. An article support as defined in claim 1 wherein the length of said detachable base and the distance between said legs extending transversely therefrom equals the distance of the horizontal spacing between three or more apertures in said panel.

5. An article support as defined in claim 4 including a plurality of apertures in said planar surface of said base member, said apertures being spaced at least a distance equal to the distance between centers of said apertures in said panel to provide a multi-hook position base.

6. An article support as defined in claim 5 wherein said apertures in said planar surface of said base member and said end portion of said hook member are rectangular in configuration.

7. An article support as defined in claim 2 wherein said angular end portion of said hook member includes at least one cylindrical portion and one rectangular portion corresponding to the configuration of said rectangular aperture in said planar surface of said base.

8. An article support for use with a panel having a substantially vertical planar surface with a plurality of spaced apertures therein comprising:
   (a) A detachable base providing a planar surface including an inner edge and having a rectangular aperture therein;
   (b) A pair of legs extending from said base upwardly and transversely from said planar surface, said legs being spaced a distance corresponding to the distance between centers of adjacent spaced apertures in said panel, the inner surface of said legs being spaced a distance equal to the thickness of said panel from said inner edge of said planar surface of said base; and
   (c) A hook member having a body portion and at least one angularly extending end integrally formed on said hook member, said end portion being rectangular in configuration and adapted to be non-rotatably received within said rectangular aperture in said planar surface, said end extending at an angle relative to said body portion of said hook member to engage said panel upon insertion through said aperture in said planar surface, whereby said legs, inner edge of said base, and said angular end of said hook member cooperate to support an article affixed to said hook member.

9. An article support as defined in claim 8 wherein the length of said detachable base and the distance between said legs extending transversely therefrom equals the distance of the spacing between three of more apertures in said panel.

10. An article support as defined in claim 9 including a plurality of rectangular apertures in said planar surface of said base member to provide a multi-hook position base.

11. An article support as defined in claim 10 wherein a plurality of angularly positioned rectangular apertures are provided in said base at each hook position whereby said hook member may be angularly positioned relative to the vertical plane of said panel at each of said hook positions.

12. An article support as defined in claim 8 wherein said angular end portion of said hook member includes at least one cylindrical portion and one rectangular portion corresponding to the configuration of said rectangular aperture in said planar surface of said base.

13. An article support as defined in claim 8 wherein said angular end portion of said hook member includes at least one cylindrical portion and two rectangular portions disposed along the longitudinal axis of said end portion, said respective cylindrical and rectangular portions being at least greater in length than the thickness of said base member, said rectangular portions being angularly off-set relative to the other whereby said hook member may be angularly adjusted relative to the vertical plane of said panel within one aperture in said planar surface of said base.

14. An article support as defined in claim 13 including a slidable latching sleeve on said hook member, said latching sleeve cooperating with said base to secure the lowest rectangular portion on said end in said rectangular aperture in said base.

15. An article support for use with a panel providing a vertical planar surface and having uniformly spaced apertures in spaced horizontal rows therein comprising:
   (a) A detachable base providing a planar surface including an inner edge and having an aperture therein;
   (b) A pair of legs extending from said base upwardly and transversely from said planar surface, said legs being spaced a distance corresponding to the distance between centers of said adjacent horizontally spaced apertures in said panel, the inner surface of said legs being spaced a distance equal to the thickness of said panel from said inner edge of said planar surface of said base;
   (c) A hook member having a body portion and at least one angularly extending end integrally formed on said hook member, said end portion being formed and adapted to be non-rotatably received within said aperture in said planar surface, said end extending at an angle relative to said body portion of said hook member to engage said panel upon insertion through said aperture in said planar surface, said legs, inner edge of said base, and said angular end of said hook member cooperating to support an article affixed to said hook member;
   (d) The length of said detachable base and the distance between said legs extending transversely therefrom equals the distance of the horizontal spacing between three or more apertures in said panel;
   (e) A plurality of apertures are disposed in said planar surface of said base member, said apertures being spaced at least a distance equal to the distance between centers of said apertures in said panel to provide a multi-hook position base;
   (f) Said apertures in said planar surface of said base member and said end portion of said hook member are rectangular in configuration;
   (g) A plurality of angularly positioned rectangular apertures are provided in said base at each hook position whereby said hook member may be angularly positioned relative to the vertical plane of said panel at each of said hook positions.

16. An article support for use with a panel providing a vertical planar surface and having uniformly spaced apertures in spaced horizontal rows therein comprising:
   (a) A detachable base providing a planar surface including an inner edge and having an aperture therein;
   (b) A pair of legs extending from said base upwardly and transversely from said planar surface, said legs being spaced a distance corresponding to the distance between centers of said adjacent horizontally spaced apertures in said panel, the inner surface of said legs being spaced a distance equal to the thickness of said panel from said inner edge of said planar surface of said base;
   (c) A hook member having a body portion and at least one angularly extending end integrally formed on said hook member, said end portion being formed and adapted to be non-rotatably received within said aperture in said planar surface, said end extending at an angle relative to said body portion of said hook member to engage said panel upon insertion through said aperture in said planar surface, said legs, inner edge of said base, and said angular end of said hook member cooperating to support an article affixed to said hook member;
   (d) Said aperture in said planar surface and said angular end portion of said hook member, being of the same angular configuration; and
   (e) Said angular end portion of said hook member including at least one cylindrical portion and two rectangular portions disposed along the longitudinal axis of said end portion, said respective cylindrical and rectangular portions being at least greater in length than the thickness of said base member, and said rectangular portions being angularly off-set relative to the other whereby said hook members may be angularly adjusted relative to the vertical plane of said panel within one aperture in said planar surface of said base.

17. An article support as defined in claim 16 including a slidable latching sleeve on said hook member, said latching sleeve cooperating with said base to secure the lower rectangular portion on said end in said rectangular aperture in said base.

References Cited
UNITED STATES PATENTS

| | | | |
|---|---|---|---|
| 3,275,272 | 9/1966 | Kirk | 248—225 |
| 3,289,994 | 12/1966 | Burmeister | 248—225 |
| 1,750,171 | 3/1930 | Goldstone | 248—223 X |
| 2,797,817 | 7/1957 | Shugarman | 211—96 |
| 2,919,881 | 1/1960 | Eames. | |
| 2,842,264 | 7/1958 | Larson. | |

J. FRANKLIN FOSS, Primary Examiner

U.S. Cl. X.R.

248—DIG. 3